Figure 1:
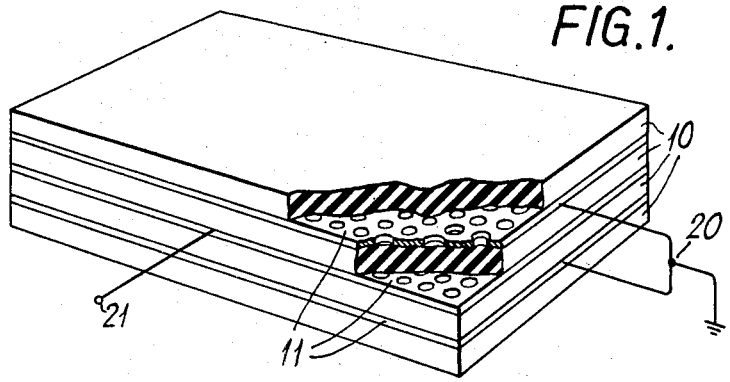

United States Patent
Trott et al.

[15] 3,678,378
[45] July 18, 1972

[54] CAPACITORS

[72] Inventors: John James Trott, Bracknell; James William Grainger, Camberley, Surrey, both of England

[73] Assignee: National Research Development Corporation, London, England

[22] Filed: March 28, 1969

[21] Appl. No.: 811,513

[30] Foreign Application Priority Data

April 4, 1968 Great Britain.....................16,316/68

[52] U.S. Cl...........................324/61 R, 73/88.5 R, 177/211, 317/246
[51] Int. Cl. .....................................G01r 27/26, H01g 7/00
[58] Field of Search.....................324/61; 73/398, 141, 88.5, 73/398 C, 141 A; 317/246, 7, 261; 177/211, 48, 210, 253

[56] References Cited

UNITED STATES PATENTS

| | | | |
|---|---|---|---|
| 2,757,923 | 8/1956 | Lefsheik | 177/210 X |
| 3,241,626 | 3/1966 | Woodburn | 177/210 X |
| 3,314,493 | 4/1967 | Kennedy | 177/210 |
| 3,328,653 | 6/1967 | Wolf, Jr. | 73/398 X |
| 2,965,877 | 12/1960 | Stein et al. | 73/398 X |
| 2,571,507 | 10/1951 | Welch | 317/246 X |
| 2,924,970 | 2/1960 | Samsel et al. | 73/141 |
| 3,056,005 | 9/1962 | Larson | 73/88.5 X |

OTHER PUBLICATIONS

Kuhl et al.; " Condenser Transmitters . . . "; Acustica; Vol. 4; No. 5; 1954; pp. 519– 532.

Primary Examiner—Rudolph V. Rolinec
Assistant Examiner—Ernest F. Karlsen
Attorney—Cushman, Darby & Cushman

[57] ABSTRACT

A capacitor is described, the capacity of which varies with pressure applied thereto. The capacitor may have sheet metal electrodes separated by natural rubber layers, one at least of the electrodes being perforated so that when pressure is applied to the capacitor the rubber can deform and the electrodes can move closer together. The capacitor may be connected in a bridge circuit which then gives an output dependent on the pressure applied. The capacitor is useful in measuring wheel and axle loads.

9 Claims, 3 Drawing Figures

PATENTED JUL 18 1972 3,678,378

CAPACITORS

The present invention relates to capacitors which can be used for measuring pressures, their capacities varying with pressure applied. Such capacitors are useful when fixed to a road surface for measuring wheel loads or axle loads of vehicles.

According to a second aspect of the present invention there is provided a capacitor comprising resilient material, forming at least part of the capacitor's dielectric, located between two electrodes, the resilient material having freedom to deform with pressure applied to the capacitor in such a manner as to allow the distance between the electrodes to decrease.

Preferably the resilient material is a layer between the electrodes, and freedom of movement is provided by a perforated layer of rigid material adjacent to the resilient material. The layer of rigid material is preferably one of the electrodes.

The capacitor may have a plurality of resilient layers made of rubber and a plurality of perforated electrodes between the layers. The electrodes may then be connected in groups to form the plates of the capacitor.

The capacitor may be connected as one arm of a bridge so that an output signal indicative of applied pressure may be obtained.

Figure 2:
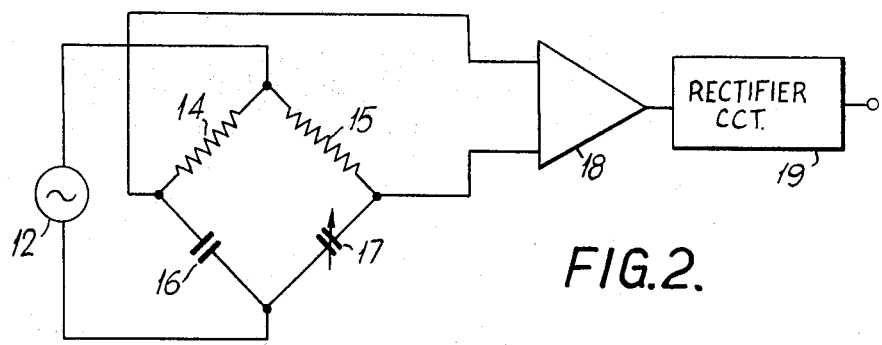
Figure 3:
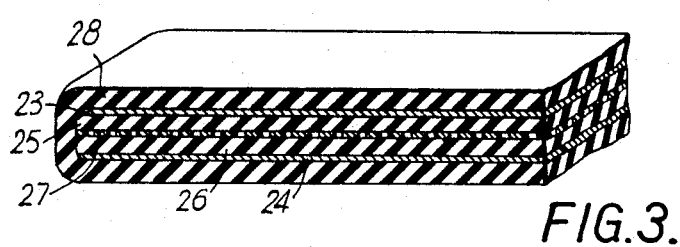

An embodiment of the invention will now be described by way of example with reference to the accompanying drawings in which:

FIG. 1 is a drawing of one embodiment of the capacitor according to the invention, FIG. 2 is a diagram of a circuit, including a capacitor according to the invention, for providing a signal whose magnitude is approximately proportional to pressure applied to the capacitor, and FIG. 3 is a section through part of another embodiment of the capacitor according to the invention.

The capacitor of FIG. 1 comprises a number of layers 10 of high-grade natural rubber cemented between sheets 11 of perforated brass or steel. The two outer sheets are connected together to form one plate of the capacitor with a terminal 20, and the inner sheet forms the other plate with a terminal 21. Natural rubber is chosen because it has low hysteresis and a fast recovery time, and is therefore suitable for applications where a load is rapidly applied to the capacitor. Such an application is the measurement of the wheel or axle loads of vehicles where the capacitor is in the form of a pad fixed to a road surface. Where a load is applied slowly other resilient material such as silastomers, neoprenes and plastics, could be used. The application of a load to the top layer 10 of the capacitor causes the rubber to deform, flowing into the perforations, so that a change of capacity occurs which is approximately proportional to the applied load. It is necessary to provide the perforations since natural rubber is nearly incompressible, but the degree of deformation, and hence the electrical sensitivity of the capacitor, can be controlled by altering the dimensions and spacings of the perforations.

An electrical signal indicative of the load applied to the capacitor can be obtained by connecting the capacitor in the circuit of FIG. 2. An alternating current source 12 is connected across opposite corners of a bridge 13. Resistors 14 and 15 make up two arms of the bridge, and the other two arms comprise the pressure measurement capacitor 16 and a variable capacitor 17. The two other opposite corners of the bridge are connected to an amplifier 18 whose output passes to a rectifier circuit 19. With no load on the capacitor 16, the capacitor 17 is adjusted for zero output from the rectifier 19. A load applied to the capacitor 16 then unbalances the bridge providing a rectifier-circuit output signal which is approximately proportional to the load applied. This output signal can be further processed so that it becomes suitable for feeding to a data-processing system. The outer perforated sheets of the capacitor should be earthed for screening purposes.

The thickness of the capacitor is not important if the loads measured are static, but if the load is to be used in measuring the wheel loads or axle loads of passing vehicles the thickness of the capacitor must be as small as possible, in order to reduce the "impact effect" of a fast-moving vehicle. This effect can be further reduced by providing a sheet rubber ramp on the approach side of the capacitor.

When the capacitor is used for measuring wheel loads or axle loads of vehicles passing along a road its width in the direction of vehicle travel must be at least equal to the length of the largest tire print likely to be encountered, that is, about 15 in. The term "tire-print" means the area of a vehicle tire normally in contact with a road surface. The width of the capacitor transverse to the direction of travel must be at least sufficient to ensure that at least one wheel of a reasonable proportion of vehicles using the road, pass over it, that is, 5 to 6 ft. If axle loads are to be recorded the transverse width should be 10 to 12 ft.

The preferred embodiment of the capacitor for use in measuring wheel loads or axle loads, comprises two solid brass outer sheets 23 and 24 (see FIG. 3) separated by natural rubber layers 25 and 26 from a perforated brass inner sheet 27, the whole capacitor being enclosed in a rubber envelope 28 for the purposes of mechanical protection and waterproofing.

While the capacitor specifically described is for use in measuring loads applied by vehicles, capacitors according to the invention can be used wherever pressures sufficient to deform the resilient layers are to be measured. Other ways of measuring the capacity of the capacitor can be used instead of the bridge method described above.

We claim:

1. A capacitor comprising:
at least two solid spaced apart electrodes, and
a layer of resilient dielectric material between the two electrodes forming an unperforated insulating layer between the electrodes, portions of said material being deformable into a plurality of cavities when forces are applied to the capacitor which tend to move the electrodes towards one another,
said cavities being defined by at least one of the electrodes,
said electrodes comprising two outer sheet-brass electrodes and a perforated sheet-brass electrode between the said outer electrodes, and
said layers comprising two natural rubber layers separating the said perforated electrode from the said outer electrodes.

2. A capacitor according to claim 1 in which the said electrodes and the said layers are enclosed in a rubber envelope.

3. A measuring capacitor for use in measuring physical properties which are capable of deforming the capacitor, said capacitor comprising:
at least two solid spaced apart electrodes, and
a layer of resilient dielectric material between the two electrodes forming an unperforated insulating layer between the electrodes, portions of said material being deformable into a plurality of cavities when forces are applied to the capacitor which tend to move the electrodes towards one another,
said cavities being defined by at least one of the electrodes,
said electrodes comprising two outer sheet metal electrodes and a perforated sheet metal electrode between the said outer electrodes, and
said layers comprising two resilient dielectric material layers separating the said perforated electrode from the said outer electrodes.

4. A capacitor according to claim 3 wherein the resilient layer is natural rubber.

5. A capacitor according to claim 3 for measuring wheel and axle loads wherein the said electrodes and the said layer are elongated and have a width in the transverse direction at least equal to the length of the largest tire print expected from wheels whose load is to be measured.

6. A capacitor according to claim 3 for measuring axle loads wherein the said electrodes and the said layer are elongated and of length sufficient to ensure that all wheels on each axle whose load is to be measured apply pressure to the said electrodes and the said layer concurrently.

7. Apparatus for indicating the application of a load including a capacitor according to claim 3 to which the load is, in operation, applied, and means for indicating that a change in capacity of the said capacitor has occurred.

8. Apparatus for providing a signal indicative of a force exerted by a load, including a capacitor according to claim 3 to which the load is, in operation, applied, a bridge circuit in one arm of which the said capacitor is connected, and means for providing a signal depending on the imbalance of the said bridge circuit.

9. Apparatus according to claim 8 wherein the bridge circuit comprises two resistors, the said capacitor and a further capacitor, the said resistors forming a pair of adjacent arms of the said bridge circuit, and the said capacitors forming a further two adjacent arms of the said bridge circuit.

* * * * *